United States Patent
Dunko (10) Patent No.: US 8,095,150 B2
(45) Date of Patent: Jan. 10, 2012

(54) METHOD AND APPARATUS FOR CONVEYING LOCATION OF LOST OR MOTIONLESS MOBILE COMMUNICATION DEVICES

(75) Inventor: Gregory A. Dunko, Cary, NC (US)

(73) Assignee: Sony Ericsson Mobile Communications AB, Lund (CH)

( * ) Notice: Subject to any disclaimer, the term of this patent is extended or adjusted under 35 U.S.C. 154(b) by 815 days.

(21) Appl. No.: 12/133,087

(22) Filed: Jun. 4, 2008

(65) Prior Publication Data

US 2009/0305721 A1    Dec. 10, 2009

(51) Int. Cl.
*H04W 24/00* (2009.01)

(52) U.S. Cl. .................... 455/456.1; 455/457
(58) Field of Classification Search ....... 455/456.1–457; 340/686.1
See application file for complete search history.

(56) References Cited

U.S. PATENT DOCUMENTS

| | | | |
|---|---|---|---|
| 5,861,808 A * | 1/1999 | Lehmann et al. ............. 340/571 |
| 6,308,073 B1 | 10/2001 | Petty et al. | |
| 6,782,251 B2 | 8/2004 | Kagay, Jr. | |
| 6,940,407 B2 | 9/2005 | Miranda-Knapp et al. | |
| 7,248,840 B2 | 7/2007 | Chien | |
| 7,313,476 B2 * | 12/2007 | Nichols et al. ............... 701/213 |
| 2005/0046580 A1 | 3/2005 | Miranda-Knapp et al. ................. 340/686.1 |
| 2005/0073389 A1 | 4/2005 | Chandley | |
| 2005/0099299 A1 * | 5/2005 | Tyroler et al. .............. 340/572.1 |
| 2005/0105510 A1 | 5/2005 | Reding et al. | |
| 2007/0024450 A1 | 2/2007 | Shichiku et al. ........... 340/573.1 |
| 2007/0077924 A1 | 4/2007 | Bhogal et al. | |
| 2007/0082676 A1 | 4/2007 | Bhogal et al. .............. 455/456.1 |
| 2007/0087736 A1 | 4/2007 | Wilson et al. | |
| 2009/0221268 A1 * | 9/2009 | Yach ......................... 455/414.1 |

FOREIGN PATENT DOCUMENTS

| | | |
|---|---|---|
| WO | WO 01/78027 | 10/2001 |
| WO | WO 02/075572 | 9/2002 |
| WO | WO 2006/009712 A2 | 1/2006 |
| WO | WO 2007/107029 | 9/2007 |

OTHER PUBLICATIONS

International Search Report and Written Opinion dated Apr. 8, 2009 issued in corresponding PCT application No. PCT/US2009/030022, 10 pages.
International Preliminary Report on Patentability dated Oct. 29, 2010 issued in corresponding PCT application No. PCT/US2009/030022, 12 pages.
Shih, Jerry et al., BellSouth Telecommunications First Step Towards Personal Communications, Sep. 27, 1994, pp. 607-611.

\* cited by examiner

*Primary Examiner* — Lester Kincaid
*Assistant Examiner* — Daniel Lai
(74) *Attorney, Agent, or Firm* — Snyder, Clark, Lesch & Chung, LLP (57) ABSTRACT

Movement of a mobile communication device is monitored during any of its powered modes. Upon sensing lack of movement, the location of the device is identified. If no movement has been sensed during a predetermined time period, determination is made as to whether the location of the device has changed. If not, a call is initiated to a remote address to convey the location of the device.

20 Claims, 6 Drawing Sheets

| CONTACT | METHOD OF COMMUNICATION | | ADDRESS | SCHEDULING INFORMATION |
|---|---|---|---|---|
| | 401 | | 403 / 405 | 407 |
| JANE DOE | ELECTRONIC MAIL | | JANEDOE@EMAIL_ADDRESS.COM | MON – FRI 12:00PM – 1:00PM |
| | . . . | | . . . | . . . |
| | TEXT MESSAGE | | (123) 456 – 7890 | MON – FRI 7:00AM – 7:45AM 7:00PM – 7:45PM |
| | TELEPHONY CALL | HOME | (987) 654 – 3210 | 01/01 – 01/14 |
| | | WORK | (101) 202 – 3030 | N/A |
| | FACSIMILE | | (555) 444 – 3333 | SAT ALL DAY |
| | . . . | | . . . | . . . |
| JOHN DOE | INSTANT MESSAGE | | JOHNDOE@INSTANT_MESSENGER.ORG | MON – FRI 8:00AM – 11:59AM 1:01PM – 6:59PM |
| | TELEPHONY CALL | CELLULAR | (999) 888 – 7777 | DEFAULT  409 |
| | | HOME | (121) 343 – 5656 | N/A |
| | | WORK | (909) 234 – 5678 | N/A |
| | . . . | | . . . | . . . |
| CONTACT "N" | METHOD "N" | | REMOTE ADDRESS "N" | SCHEDULE "N" |

| LOCATION 501 | POSITIONING INFORMATION 503 | AREA OF COVERAGE 505 | THRESHOLD TIME "LACK OF MOVEMENT" 507 | THRESHOLD TIME "STILL" 509 |
|---|---|---|---|---|
| HOME | 1111 FIRST STREET CITY, STATE 12345 | 0.5 MILES | 5 HRS | 1 DAY |
| GYM | 1111 SECOND AVENUE CITY, STATE 12345 | 0.25 MILES | 10 MINS | 2.5 HRS |
| WORK | 12° 45' 67" NORTH 88° 99' 00" WEST | 0.1 MILES | 5 MINS | 8 HRS |
| . . . | . . . | . . . | . . . | . . . |
| LOCATION "N" | POSITION "N" | AREA OF COVERAGE "N" | MOVEMENT THRESHOLD "N" | STILL THRESHOLD "N" |

| | 601 | 603 | 605 | 607 | 609 |
|---|---|---|---|---|---|
| | CONTACT | ADDRESS | DATE | TIME | STATUS |
| | JANE DOE | (987) 654 – 3210 | JANUARY 1 | 9:00AM | INCOMING |
| | JANE DOE | (987) 654 – 3210 | JANUARY 2 | 9:30AM | OUTGOING |
| | . . . | . . . | . . . | . . . | . . . |
| | JANE DOE | (101) 202 – 3030 | JUNE 2 | 10:21PM | INCOMING |
| | . . . | . . . | . . . | . . . | . . . |
| | JOHN DOE | (999) 888 – 7777 | DECEMBER 3 | 4:37PM | OUTGOING |
| | JOHN DOE | (999) 888 – 7777 | DECEMBER 4 | 5:37PM | OUTGOING |
| | JOHN DOE | (999) 888 – 7777 | DECEMBER 5 | 5:00PM | OUTGOING |
| | . . . | . . . | . . . | . . . | . . . |
| | CONTACT "N" | ADDRESS "N" | DATE "N" | TIME "N" | STATUS "N" |

METHOD AND APPARATUS FOR CONVEYING LOCATION OF LOST OR MOTIONLESS MOBILE COMMUNICATION DEVICES

BACKGROUND

The present invention relates to mobile communication devices, more particularly to automatically providing notification and location of lost or motionless mobile communication devices.

Mobile communication devices, such as cellular phones, laptop computers, pagers, personal communication systems (PCS), personal digital assistants (PDA), and the like, provide advantages of ubiquitous communication without geographic or time constraints, as well as the added security of being able to contact help in the event of an emergency. Advances in technology and services have also given rise to a host of "additional" features beyond merely voice communication including, for example, short or multimedia messaging, multimedia playback, electronic mail, audio-video capturing, interactive gaming, data manipulation, web browsing, and the like. Other enhancements, such as, location-awareness features, e.g., global position system (GPS) tracking, enable mobile communication devices to monitor their position and present their location via a local display.

Unfortunately, the easy portability of these devices often leads to misplacement and loss. Misplacement may involve merely forgetfulness by the user of one of several normal places at which the instrument was left, or the inadvertent failure to take the device when leaving a public or remote area. In either event, the user is deprived of the use of the device until it is retrieved. If the device is in fact permanently lost, immediate replacement of the device with a new instrument and service is necessary to minimize unauthorized use and divulgement of private or confidential information.

Accordingly, a need exists for automatically notifying a user of a mobile communication device of the possibility of its loss or misplacement. Provision of the location of the device in such notification would be beneficial to permit the user retrieve it and thereby avoid its permanent loss. A further needed benefit would be a capability to determine whether the device is situated in a normal location, and thus unlikely to be lost, or at a location of greater risk. In the former situation, the device may not have been misplaced if the user had intended its inactivity at the time, for example, while on travel. A need thus exists to provide the user with options to selectively deactivate loss notification entirely or for normal locations of the device.

DISCLOSURE

The above described needs are fulfilled, at least in part, by monitoring movement of a mobile communication device during any of its powered modes. Upon sensing lack of movement, the location of the device is identified. If no movement has been sensed during a predetermined time period, determination is made as to whether the location of the device has changed. If not, a call is initiated to a remote address to convey the location of the device.

The mobile device has built-in capabilities to help find it when lost. With location determination capability, such as GPS, and motion sensor capability, such as an accelerometer, an algorithm in the device is appropriately activated. The messaging/calling capability of the device makes it possible to intelligently determine who should be contacted and to initiate the call.

The remote address may be established in accordance with user preference, identified by a specific address stored for the purpose of notification or in accordance with a prioritized list of addresses stored in the device. Alternatively, the notification functionality may be set to call the last address called by the device or an address most commonly called previously.

The device may be provided with a capability of distinguishing a potential lost situation on the basis of whether or not its location is at a "normal" location. If the location is judged to be a normal location, no notification call is initiated. Such feature may be optionally set by the user. The location may be judged to be normal if it is compared favorably with a predefined normal location stored in the device. The normal location may be one of a stored list of locations.

The lost notification functionality may be deactivated by the user if it is intended that the device will not be used for a subsequent period and later may again be activated. An active lost notification condition may also be set for specified times in accordance with a user established schedule. Such a provision would avoid unnecessary inconvenience for the called party.

Additional advantages of the present invention will become readily apparent to those skilled in this art from the following detailed description, wherein only the preferred embodiments of the invention are shown and described, simply by way of illustration of the best mode contemplated of carrying out the invention. As will be realized, the invention is capable of other and different embodiments, and its several details are capable of modifications in various obvious respects, all without departing from the invention. Accordingly, the drawings and description are to be regarded as illustrative in nature, and not as restrictive.

BRIEF DESCRIPTION OF THE DRAWINGS

The present invention is illustrated by way of example, and not by way of limitation, in the figures of the accompanying drawing and in which like reference numerals refer to similar elements and in which.

DETAILED DESCRIPTION

Figure 1:
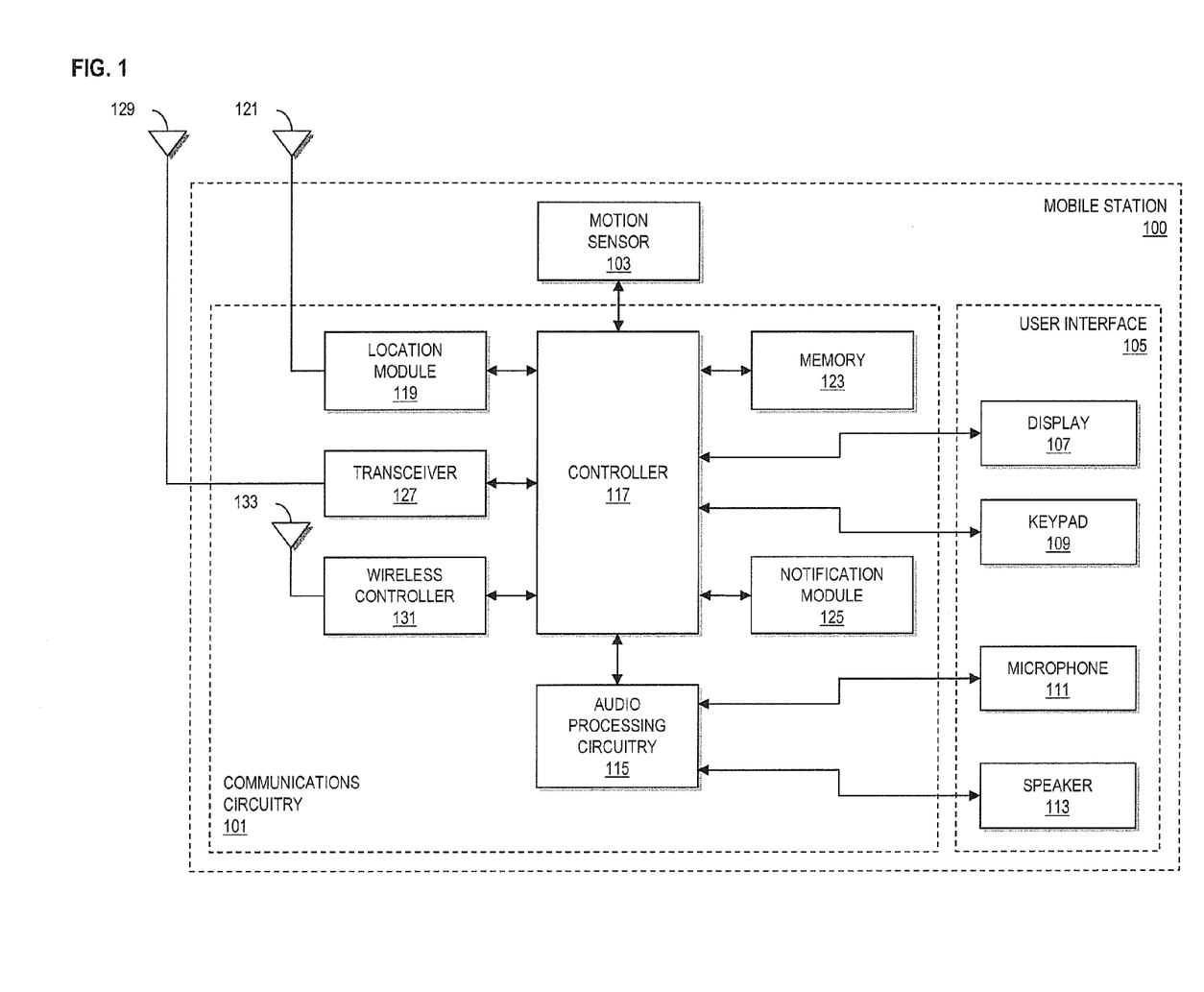
FIG. 1 is a block diagram of a mobile station, according to an exemplary embodiment.

FIG. 1 is a block diagram of a mobile station 100, according to an exemplary embodiment. Mobile station 100 includes communications circuitry 101, motion sensor 103, and user interface 105. User interface 105 includes display 107, keypad 109, microphone 111, and speaker 113. Display 107 provides a graphical interface that permits a user of mobile station 100 to view dialed digits, call status, menu options, and other service information. The graphical interface may include icons and menus, as well as other text and symbols. Keypad 109 includes an alphanumeric keypad and may represent other input controls, such as a joystick, button controls, touch panel, dials, etc. The user thus can construct user profiles, enter commands, initialize applications, input remote addresses, and select options from menu systems.

Microphone 111 converts spoken utterances of a user into electronic audio signals, while speaker 113 converts audio signals into audible sounds.

Communications circuitry 101 includes audio processing circuitry 115, controller 117, location module 119 (such as GPS receiver) coupled to antenna 121, memory 123, notification module 125, transceiver 127 coupled to antenna 129, and wireless controller 131 couple to antenna 133. Memory 123 may represent a hierarchy of memory, which may include both random access memory (RAM) and read-only memory (ROM). Computer program instructions, such as "still and lost" application instructions, and corresponding data for operation can be stored in non-volatile memory, such as erasable programmable read-only memory (EPROM), electrically erasable programmable read-only memory (EEPROM), and/or flash memory. Memory 123 may be implemented as one or more discrete devices, stacked devices, or integrated with controller 117. Memory 123 may store information, such as one or more user profiles, one or more user defined policies, one or more contact lists, etc.

Controller 117 controls the operation of mobile station 100 according to programs and/or data stored to memory 123. Control functions may be implemented in a single controller or via multiple controllers. Suitable controllers may include, for example, both general purpose and special purpose controllers and digital signal processors. Controller 117 may interface with audio processing circuitry 115, which provides basic analog output signals to speaker 113 and receives analog audio inputs from microphone 111. Controller 117, as will be described in more detail below, is configured to execute a "still and lost" application stored to memory 123

"Still and lost" notifications can be applicable to any wireless two-way communicator. For example, mobile station 100 can be a cellular phone, a two-way trunked radio, a combination cellular phone and personal digital assistant (PDA), a smart phone, a cordless phone, a satellite phone, or any other suitable mobile device with telephony capabilities, such as a mobile computing device. Mobile station 100 may also correspond to suitable portable objects, devices, or appliances including a transceiver, such as a wireless fidelity (WiFi) transceiver, a worldwide interoperability for microwave access (WiMAX) transceiver, and the like.

Figure 2:
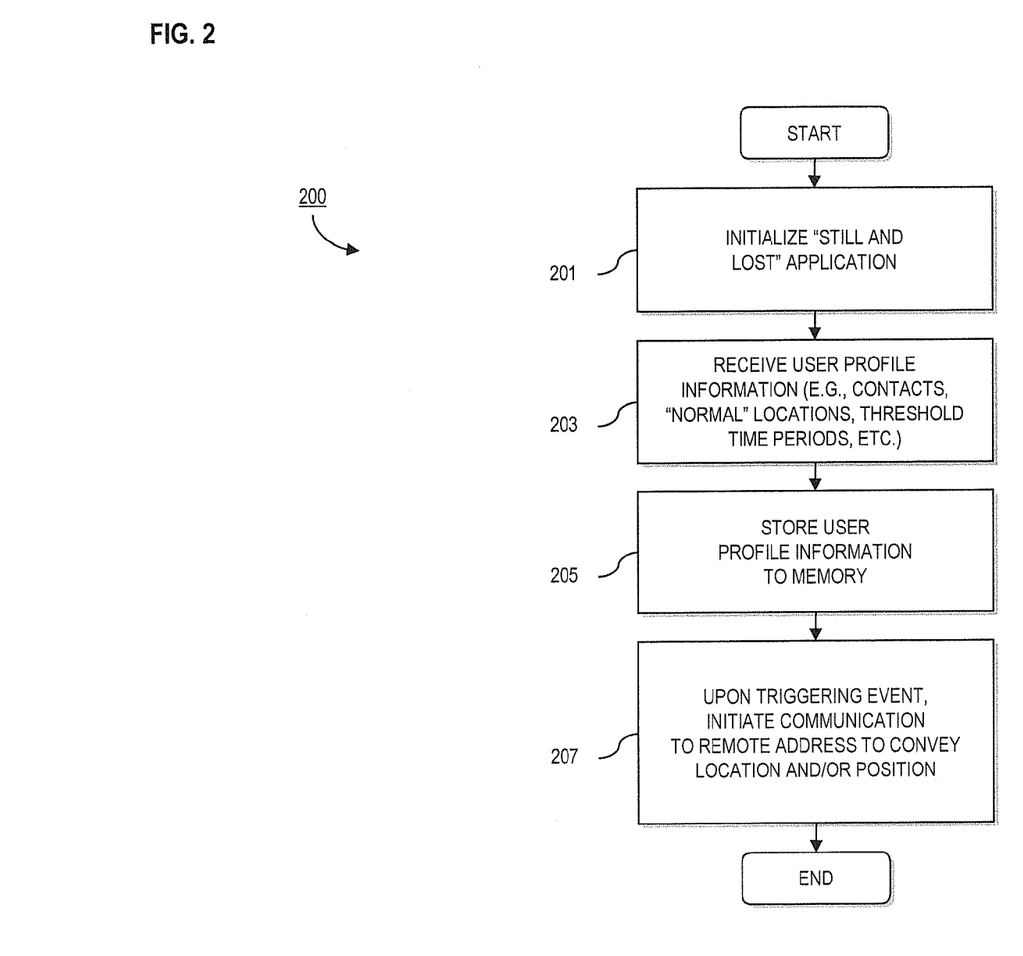
FIGS. 2 and 3 are flowcharts of processes for operating the mobile station of FIG. 1, according to exemplary embodiments.

FIG. 2 is a flowchart of a process 200 for operating mobile station 100 of FIG. 1, according to an exemplary embodiment. At step 201, mobile station 100 executes a "still and lost" application in response to user initialization. Execution of this application may occur automatically or may be user initiated. The application may be setup once or every time the phone is re-initialized. This operation may be user definable. Controller 117 implements instructions stored to memory 123 in response to user interaction with user interface 105, e.g., keypad 109. Operation of controller 117 provides a graphical interface to the user via display 107. The graphical interface may include one or more input fields, menus, options, selections, etc., that enables the user to input profile information to mobile station 100, per step 203.

User profile information may include one or more contacts, methods of communication, remote addresses, scheduling information (appointments, travel, Out of office, etc.), priorities, locations, positioning information, areas of coverage, and/or threshold time periods, as well as any other suitably configurable parameter. For example, user contact information may be correlated by name with a communication address and a set of GPS coordinates. User profile information may be input via user interface 105, e.g., keypad 109, microphone 111, etc. A user may be provided with the capability to download user profile information to mobile station 100 via a wired (e.g., universal serial bus (USB), etc.) or wireless (e.g., infrared, wireless local area network, etc.) connection. User profile information may be synchronized with a central repository (not shown) of, for example, a network of a service provider, e.g., a radio network.

In step 205, the user profile information is stored to memory 123. This information can be uploaded (or synchronized) with a centralized repository. The "still and lost" application may then continue to be executed via controller 117 as a background application. Alternatively, mobile station 100 can be set by the user to be operated in accordance with a time schedule, or arbitrarily. At step 207, a triggering event invokes initiation of communication by the mobile station 100 transceiver 127. Although the initiated communication is exemplified by a voice call to a telephone number address, such communication may by made, for to electronic mail address or to any message address, for example, via instant message, multimedia message, text message. The relative location and/or absolute spatial position of mobile station 100, may be conveyed during step 207.

The relative location and/or absolute spatial position of the mobile station may be resolved via location module 119, controller 117, transceiver 127, or combination thereof. As one example, the spatial coordinates of the station may match stored coordinates for normal locations entered by the user in step 203. These locations may be correlated in memory with place names (such as office, home, etc.) and the place name conveyed in the communication. The recipient then may identify more easily the phone for retrieval.

Figure 3:
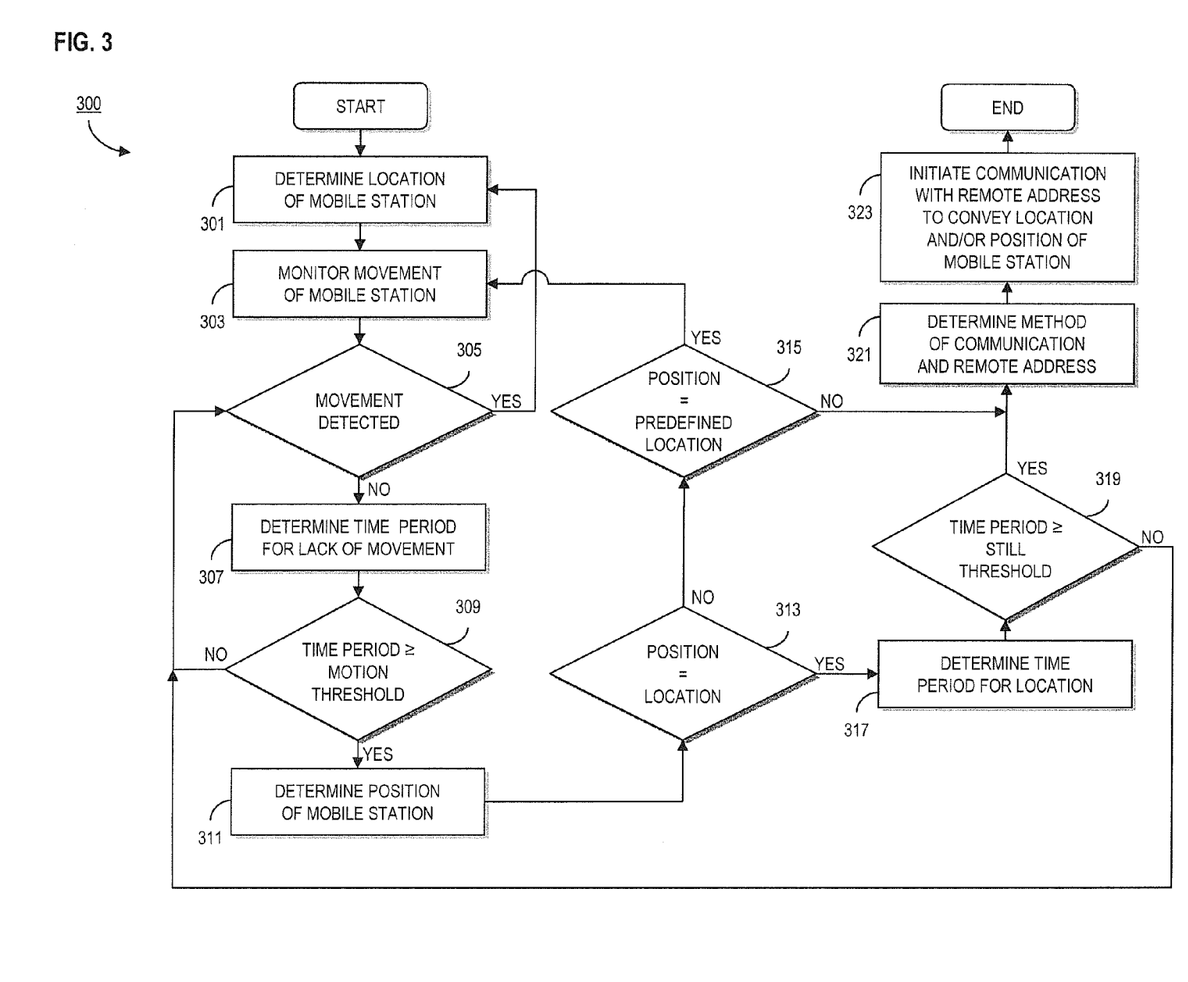

FIG. 3 is a more detailed flowchart 300 of an example of operation in accordance with step 207. At step 301, mobile station 100 determines its location, either its relative geographic area or alternatively and/or additionally its absolute spatial position (e.g., latitude, longitude, altitude, etc.). The location (or spatial position) of mobile station 100 may be determined via controller 117, location module 119, transceiver 127, or a combination thereof. For instance, mobile station 100 may utilize any suitable location determination technology, such as GPS, A-GPS, EOTD, WLAN, etc., to resolve its location and/or spatial position.

In step 303, mobile station 100 monitors its movement via motion sensor 103, which may port any sensed motion to controller 117 for analysis. Motion sensor 103 may comprise an accelerometer or any vibration\motion sensing device. At step 305, controller 117 determines whether motion is detected. The process of sensing motion may occur over an appropriate integration interval (e.g., has motion occurred in last 5 minutes). If motion is detected, then process 300 reverts to step 301 to determine its location. The process of determining new location may in some cases be triggered by sensing that motion has ceased (e.g., the device has arrived at a new location). Alternatively, process 300 may revert to step 303 to continue monitoring the motion of mobile station 100. If no motion is detected at step 305, then controller 117 determines, in step 307, a time period for lack of movement based on the input provided by motion sensor 103.

Controller 117 then compares, at step 309, the time period for lack of movement to a threshold "lack of movement" time period stored to, for instance, memory 123. If the determined time period is less than the threshold time period, the process reverts to step 305 and the mobile station continues to monitor whether any movement is detected. If it is determined at step 309 that the time period is greater than or equal to the threshold time period, then, at step 311, mobile station 100 determines its current location via controller 117, location module 119, transceiver 127, or a combination thereof.

At step 313, controller 117 determines whether the new location of mobile station 100 corresponds to the location determined in step 301. This determination is indicative of whether mobile station 100 continuously has been in the same relative vicinity. If the new location of mobile station 100 does not correspond to the location last identified in step 301, then controller 117 compares the new location to one or more predefined locations stored to, for example, memory 123, at step 315. The comparison between the new location and location of mobile station 100 may be based on a proximity determination, for example within a defined radius.

The comparison step 315, serves to provide a "normal location" functionality. The normal location may be taken as indicative of device misplacement, rather than loss. If the new location of mobile station 100 is determined to compare favorably with a predefined "normal" location, the process reverts to step 303 and no communication is yet initiated. Step 315 may be provided as an optional feature in the initialization 201. The user may choose to be notified of device misplacement as well as potential device loss and thus may opt to eliminate the "normal location" feature.

If it is determined in step 313 that the new location of mobile station 100 is within the proximity of the last location determined at step 301, then controller 117 determines a time period during which the mobile station 100 has remained at the same location, at step 317. This information may be determined by comparing a "then current" time determination with a time stamp when mobile station 100 determined its location in step 301. Any other suitable determination method may be utilized.

At step 319, controller 117 compares the time determination of step 317 with a threshold "still" time period stored to, for example, memory 123. If the determined time period is less than the threshold time period, process 300 reverts to step 305, i.e., mobile station 100 continues to ascertain whether any movement is detected via sensed input provided by motion sensor 103. If the determined time period is greater than or equal to the threshold time period as decided in step 319, or the new location of mobile station 100 corresponds to a predefined location as decided in step 315, then the controller 117 determines a method of communication in step 321.

The method of communication may have been preset to voice call, or based on information within a user profile stored in memory 123. Modes of communication may include electronic mail, facsimile, instant message, multimedia message, text message, or other communication schemes. Corresponding contact addresses may be listed in the stored user profile. Determination of the communication recipient, for example, may be based on an identified preselected setting or on the last called address, most frequently previously called address, or any other method preferred by the user.

At step 323, notification module 125 initiates the method of communication for the remote address determined in step 321. The communication contains the location information for mobile station 100. The communication may be restricted to simply providing the location, or may be subject to receipt by the mobile station of signals from the recipient. Such signaling may afford remote control of the mobile station functionality.

Figure 4:
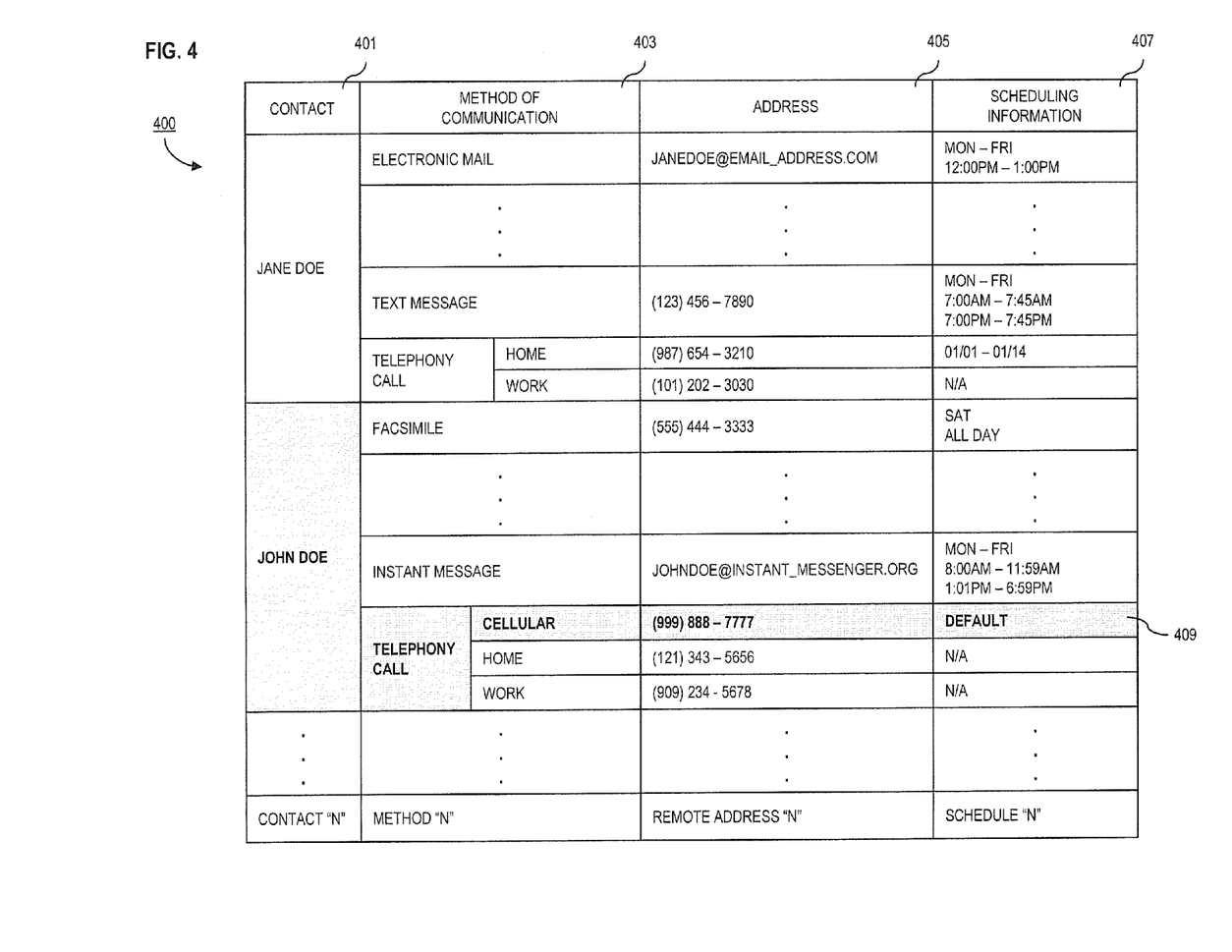
FIG. 4 is a schematic illustration of a list of prioritized contacts, according to an exemplary embodiment.

FIG. 4 is an exemplified schematic illustration of a prioritized list 400 that correlates contacts 401 with methods of communication 403, addresses 405, and scheduling information 405. In the illustrated example, a default telephone call recipient, John Doe, is identified. If a call cannot be completed to the default recipient, scheduling information for alternative recipients can be tailored to the user's expectancy that the outgoing communication will most efficiently received and processed by the recipient.

The user may be provided with an option to select, alternatively, the prioritized list as shown in FIG. 4 or to have operation set initiate contact only to the default recipient, John Doe. In either option, a further feature may be provided wherein a time schedule may be store that defines periods during which no communication is to be initiated.

Figure 5:
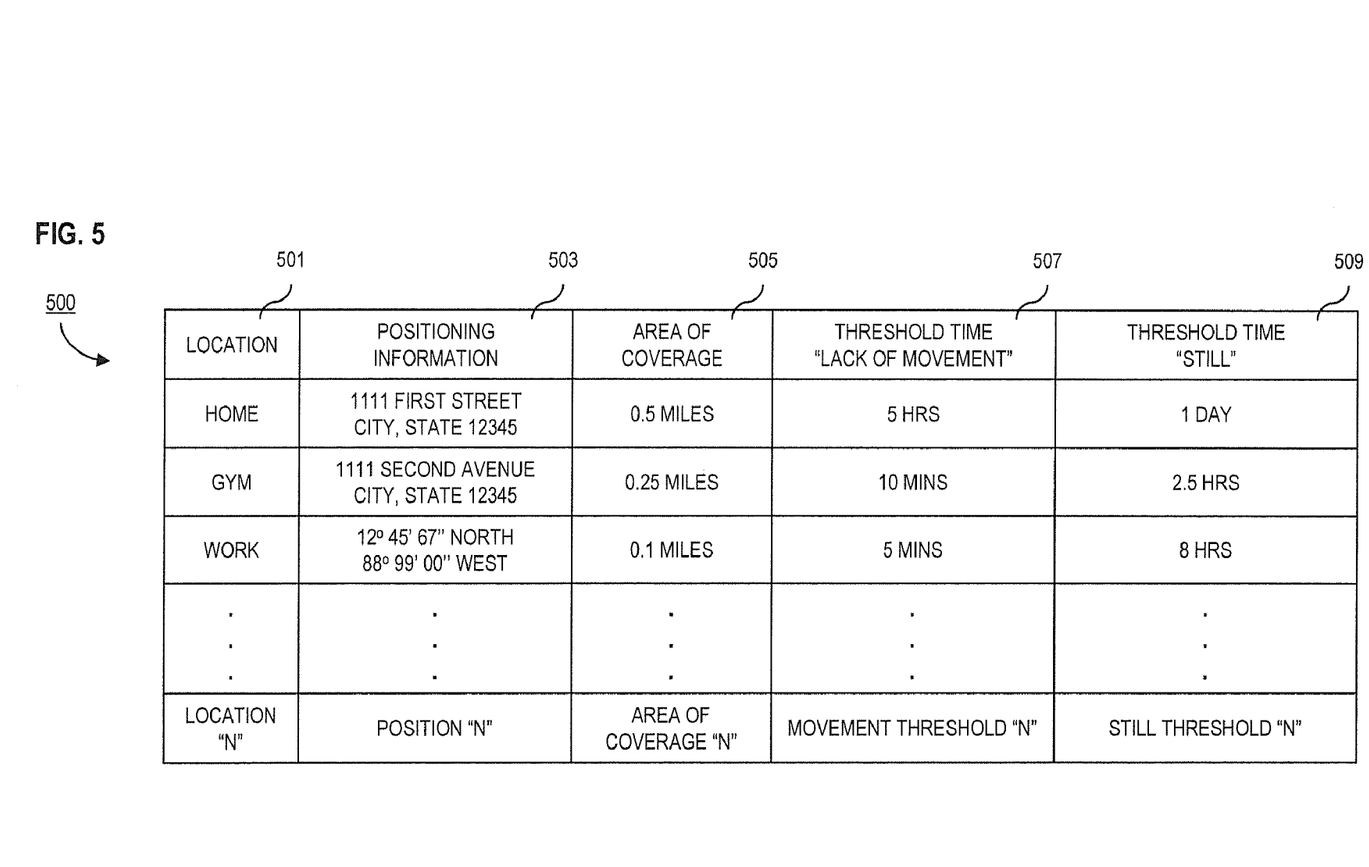
FIG. 5 is a schematic illustration of a list of "normal" locations, according to an exemplary embodiment.

FIG. 5 is an exemplified schematic illustration of a list of "normal" locations. The list correlates locations 501 with positioning information 503. The positioning information may be represented by identification commonly recognized by the user as well as postal address, spatial coordinates, and any other description by which the notification may be meaningful to the user. The listing optionally may further include an area of coverage 505, threshold time for "lack of movement" 507 and threshold time for "still" 509 that are correlated respectively with the locations. The area of coverage defines whether the identified position of the mobile device is in a "normal position." The "lack of movement threshold" sets a time at which the device can be considered to be misplaced. The "still" threshold sets a time indicative of a lost device.

Figure 6:
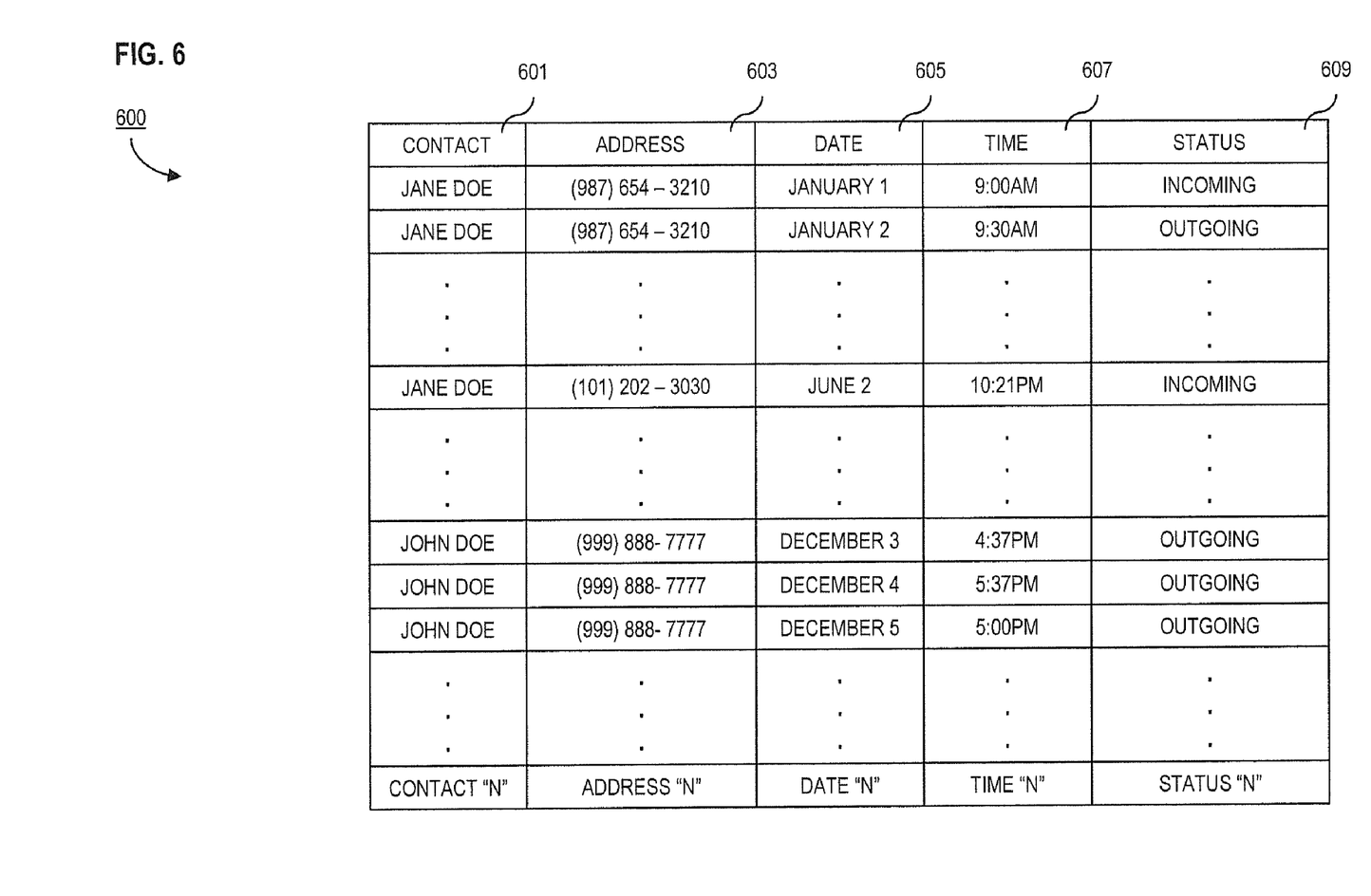
FIG. 6 is a schematic illustration of a list of previous contacts, according to an exemplary embodiment.

FIG. 6 is an exemplified schematic illustration of a list of previous contacts, according to an exemplary embodiment. The list correlates contacts 601 with addresses 603, dates 605, times of calls 607, and call status 609. This information may used to implement determination of a notification of a communication recipient, useful if no prioritized listing, such as shown in FIG. 4 has been established. For example, the device may notify the last called contact or the contact that is called most often . . . .

In this disclosure there are shown and described only preferred embodiments of the invention and but a few examples of its versatility. It is to be understood that the invention is capable of use in various other combinations and environments and is capable of changes or modifications within the scope of the inventive concept as expressed herein.

What is claimed is:

1. A method for mobile device operation, the method comprising:
   identifying, by a mobile communication device, a location associated with the mobile communication device;
   determining, by the mobile communication device, whether a time period has transpired indicative of the mobile communication device being motionless;
   identifying, by the mobile communication device, a subsequent location associated with the mobile communication device when it is determined that the time period has transpired indicative of the mobile communication device being motionless;
   comparing, by the mobile communication device, the location with the subsequent location;
   determining, by the mobile communication device, whether the mobile communication device has not changed locations for a predetermined time period based on the comparing;
   identifying, by the mobile communication device, that the mobile communication device is lost when it is determined that the mobile communication device has not changed locations for the predetermined time period; and
   initiating, by the mobile communication device, a communication to a recipient, wherein the communication includes the subsequent location of the mobile communication device.

2. A method as recited in claim 1, wherein the determining, by the mobile communication device, whether the time period has transpired comprises:
   monitoring movement of the mobile communication device;
   detecting lack of movement of the mobile communication device;
   determining a lack of movement time period for the mobile communication device;
   comparing the lack of movement time period with the time period; and
   identifying, based on the comparing, that the mobile communication device is motionless when the lack of movement time period is at least equal to the time period.

3. A method as recited in claim 1, wherein the initiating comprises:
   identifying a remote address associated with the recipient in accordance with a preference stored by the mobile communication device.

4. A method as recited in claim 1, further comprising:
   determining whether a prioritized list including one or more recipients for notification is stored by the mobile communication device; and
   selecting a last communicated contact or a contact most often communicated as the recipient when it is determined that the prioritized list is not stored by the mobile communication device.

5. A method as recited in claim 4, further comprising:
   selecting one of the one or more recipients from the prioritized list when it is determined that the prioritized list is stored by the mobile communication device.

6. A method as recited in claim 1, further comprising:
   determining a second time period for which the mobile communication device remains in a same location when it is determined that the location and the subsequent location are the same or within a predefined radius; and
   comparing the second time period to the predetermined time period.

7. A method as recited in claim 1, further comprising:
   storing a prioritized list of recipients for which to initiate communication when it is determined that the mobile communication device is lost, wherein for one or more of the recipients, a method of communication, a remote address, and a schedule pertaining to the one or more recipients is stored.

8. A method as recited in claim 1, further comprising:
   determining whether the subsequent location is a normal location for the mobile communication device; and
   terminating call initiation if the subsequent location is determined to be the normal location.

9. A method as recited in claim 8, wherein the determining comprises:
   storing one or more normal locations in the mobile communication device; and
   comparing the subsequent location with one or more of the one or more normal locations stored by the mobile communication device.

10. A method as recited in claim 9,
    further comprising:
    storing a time period value, to indicate that the mobile communication device is motionless and misplaced, for one or more of the one or more normal locations; and
    storing a predetermined time period value, to indicate that the mobile communication device is lost, for one or more of the one or more normal locations.

11. A method as recited in claim 1, wherein the initiating comprises:
    determining that a location reporting operation has been set to an active condition in the mobile communication device.

12. A method as recited in claim 1, further comprising:
    receiving one or more signals, in response to the communication, wherein the one or more signals include remote control signals for the mobile communication device.

13. A mobile communication device comprising:
    a controller;
    a memory to store instructions;
    a communication interface; and
    a motion sensor,
    wherein the controller executes the instructions and configures the controller to:
        identify a location associated with the mobile communication device;
        determine whether a time period has transpired indicative of the mobile communication device being motionless based on a signal received from the motion sensor;
        identify a subsequent location associated with the mobile communication device when it is determined that the time period has transpired;
        compare the location with the subsequent location;
        determine whether the mobile communication device has not changed locations for a predetermined time period based on a comparison of the location with the subsequent location;
        identify that the mobile communication device is lost when it is determined that the mobile communication device has not changed locations for the predetermined time period; and
        initiate a communication, via the communication interface, to a recipient, wherein the communication includes the subsequent location of the mobile communication device.

14. A mobile communication device as recited in claim 13, wherein the motion sensor is an accelerometer, and the motion sensor is configured to:
    monitor movement of the mobile communication device, and wherein the controller executes the instructions and further configures the controller to:
    identify a location of the mobile communication device when movement of mobile communication device is detected by the motion sensor.

15. A mobile communication device as recited in claim 13, further comprising:
    a user memory coupled to the controller,
    wherein the user memory is configured to store a user preference list, and the controller executes the instructions and further configures the controller to:
    determine whether the user preference list including one or more recipients for notification is stored by the user memory; and
    select a last communicated contact or a contact most often communicated as the recipient when it is determined that the user preference list is not stored by the user memory.

16. A mobile communication device as recited in claim 15, wherein the controller executes the instructions and further configures the controller to:
    select one of the one or more recipients from the user preference list, for which to initiate communication, when it is determined that the user preference list is stored by the user memory.

17. A mobile communication device as recited in claim 13, wherein the controller executes the instructions and further configures the controller to:
- determine a time period for which the mobile communication device remains in a same location when it is determined that the location and the subsequent location are the same or within a predefined radius; and
- compare the time period to the predetermined time period, and wherein the mobile communication device further comprises:
- a user memory to store a user preference list that includes a location reporting operation schedule that defines time periods during which no communication is to be initiated, and the controller execute the instructions and further configures the controller to:
- initiate the communication based on the location reporting operation schedule.

18. A mobile communication device as recited in claim 17, wherein the user preference list includes identification of normal locations of the mobile communication device, and the controller executes the instructions and further configures the controller to:
- identify whether the subsequent location corresponds to one of the normal locations included in the user preference list.

19. A mobile communication device as recited in claim 13, wherein the controller executes the instructions and further configures the controller to:
- receive one or more signals via the communication interface, in response to the communication, wherein the one or more signals include remote control signals pertaining to an operation of the mobile communication device.

20. A mobile communication device as recited in claim 13, further comprising:
- a user memory configured to store a prioritized list of recipients, wherein for one or more of the recipients a method of communication, a remote address, and a schedule pertaining to the one or more recipients is stored, and wherein when initiating the communication the controller initiates the communication, via the communication interface, based on the prioritized list.

* * * * *